United States Patent
Do

(10) Patent No.: US 6,263,187 B1
(45) Date of Patent: Jul. 17, 2001

(54) OBTAINING DATA FOR CALLS MADE BY A SPECIFIC/CELLULAR MOBILE STATION

(75) Inventor: Tuan Anh Do, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/227,374

(22) Filed: Jan. 8, 1999

(51) Int. Cl.[7] .................................................. H04B 17/02
(52) U.S. Cl. ............................ 455/9; 455/67.1; 455/436; 455/560
(58) Field of Search .............................. 455/9, 423, 425, 455/436, 438, 439, 560, 67.1

(56) References Cited

U.S. PATENT DOCUMENTS

| | | | |
|---|---|---|---|
| 5,682,380 | * | 10/1997 | Park et al. .......................... 455/436 |
| 5,850,607 | * | 12/1998 | Muszynski ......................... 455/436 |
| 5,854,981 | * | 12/1998 | Wallstedt et al. ................... 455/439 |
| 5,884,175 | * | 3/1999 | Schiefer et al. .................... 455/436 |
| 5,991,628 | * | 11/1999 | Pedziwiatr et al. ................ 455/443 |
| 6,035,199 | * | 3/2000 | Barnett .............................. 455/436 |
| 6,061,565 | * | 5/2000 | Innes et al. ........................ 455/436 |
| 6,088,587 | * | 7/2000 | Abbadessa ......................... 455/424 |
| 6,091,953 | * | 11/1998 | Ho et al. ............................ 455/436 |
| 6,119,005 | * | 11/2000 | Smolik ............................... 455/436 |
| 6,129,604 | * | 10/2000 | Maveddat et al. ................. 455/436 |

* cited by examiner

*Primary Examiner*—Nay Maung
*Assistant Examiner*—Quochien B. Vuong
(74) *Attorney, Agent, or Firm*—Werner Ulrich

(57) ABSTRACT

The method and apparatus for automatically monitoring call processing transactions performed in base stations of a mobile cellular telecommunications switching system. A mobile switching center maintains a list of mobile stations whose calls are being monitored. When one of these mobile stations originates a call, or when an incoming call is received for such a mobile station, the base station originally serving the call is notified, and that base station then transmits messages recording reportable events for that mobile station. When that mobile station is handed off to another base station, the other base station receives an indication from the first base station that it is to monitor the call of that mobile station. When a base station no longer serves a mobile station that is being monitored, it clears the record that the mobile station is to be monitored from its data base. Advantageously, this arrangement has the characteristic that only base stations actually serving base stations that are being monitored, maintain a record of the base station being monitored.

20 Claims, 3 Drawing Sheets

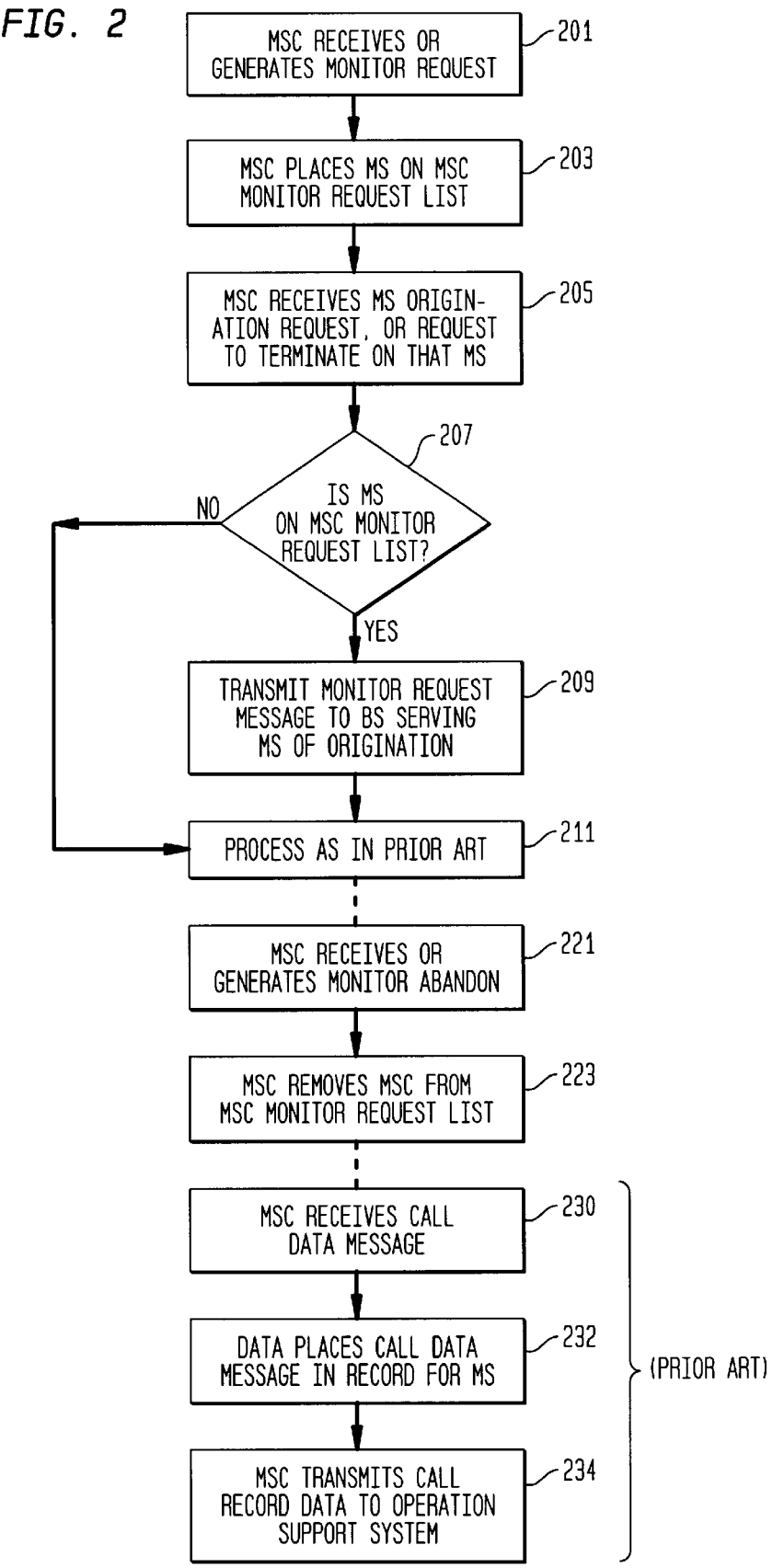

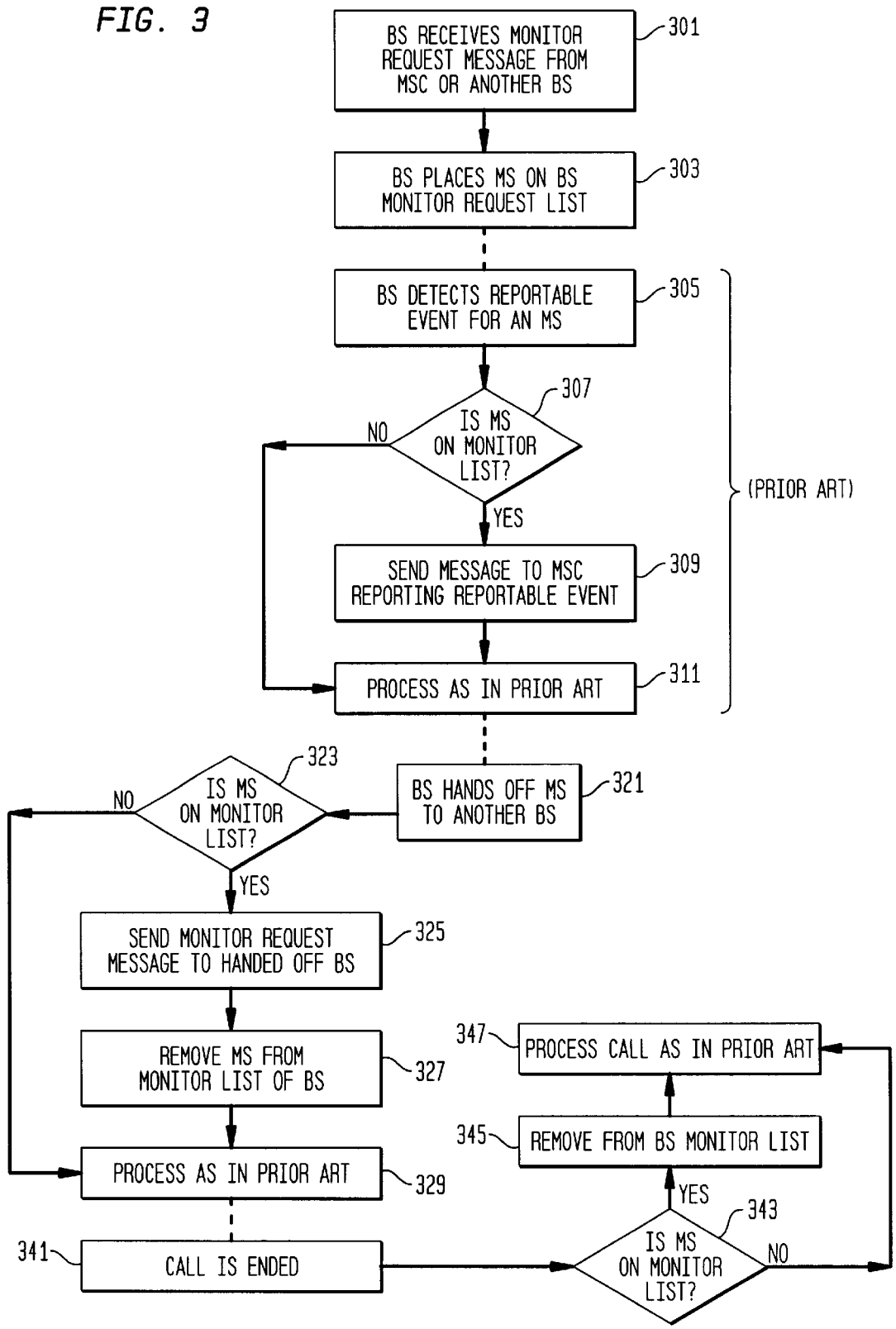

OBTAINING DATA FOR CALLS MADE BY A SPECIFIC/CELLULAR MOBILE STATION

TECHNICAL FIELD

This invention relates to arrangements for obtaining data for calls made by a selected mobile station.

1. Problem

The control of a cellular mobile switching system is necessarily highly distributed between a centralized mobile switching center and a plurality of base stations, each for communicating with mobile stations in a surrounding area (cell). Tracking down software problems, or problems associated with incorrect data at a base station, is particularly difficult in such a distributed system, wherein a mobile station is moving unpredictably among many base stations. A powerful diagnostic tool for detecting such problems and obtaining information necessary to suggest a correction, is the obtaining of all call data for calls made by a particular mobile station which has given indications that the processing of calls for that station is not proceeding smoothly. An example of such an indication is the rejection of a hand-off request initiated by a requesting base station by the requested base station.

In the prior art, all such information about calls made from, or to, a selected mobile station are obtained by having a flag associated with that station in all base stations that may serve that mobile station. Since the mobile station is unfettered in its movements, a problem of the prior art is that setting up of such flags without missing base stations that may control calls for the selected mobile station is cumbersome, and likely to set an excessive number of flags. Each flag must be checked on every message from a base station in order to insure that data is collected only for a selected mobile station. In most cases, the number of selected main stations is quite small, but the effect on processing capacity of having to check for every such message whether the mobile station of the message is a flag station, is substantial and adverse. A problem of the prior art is that there is no efficient method of obtaining all or most of the data for a mobile station.

2. Solution

Applicant has further analyzed this problem, and has recognized that it is only necessary to maintain a flag, or monitor indication, in a base station for a selected mobile station whenever that base station is actually controlling actions of the mobile station.

Applicant has solved the above problem, and has made a contribution over the prior art by his invention, wherein a monitor indication is created in a base station whenever the selected mobile station is registered in, or is controlled by that base station; when a mobile station is handed off from one base station to another, the hand-off message set includes an indication that the mobile station being handed off is a selected mobile station whose call record data is being monitored. Advantageously, only the base stations actually controlling a call of the selected mobile station have an indicator for that mobile station, and the search to determine whether a mobile station is being monitored is expedited. Advantageously, such an arrangement minimizes software changes in order to implement Applicant's invention.

In accordance with one alternate embodiment of Applicant's invention, the flag indicator is transmitted in one bit of a proprietary protocol message, during the process of handing off a mobile station from one base station to another.

BRIEF DESCRIPTION OF THE DRAWING

FIGS. 2–3 are flow charts illustrating the method of Applicant's invention.

DETAILED DESCRIPTION

Figure 1:
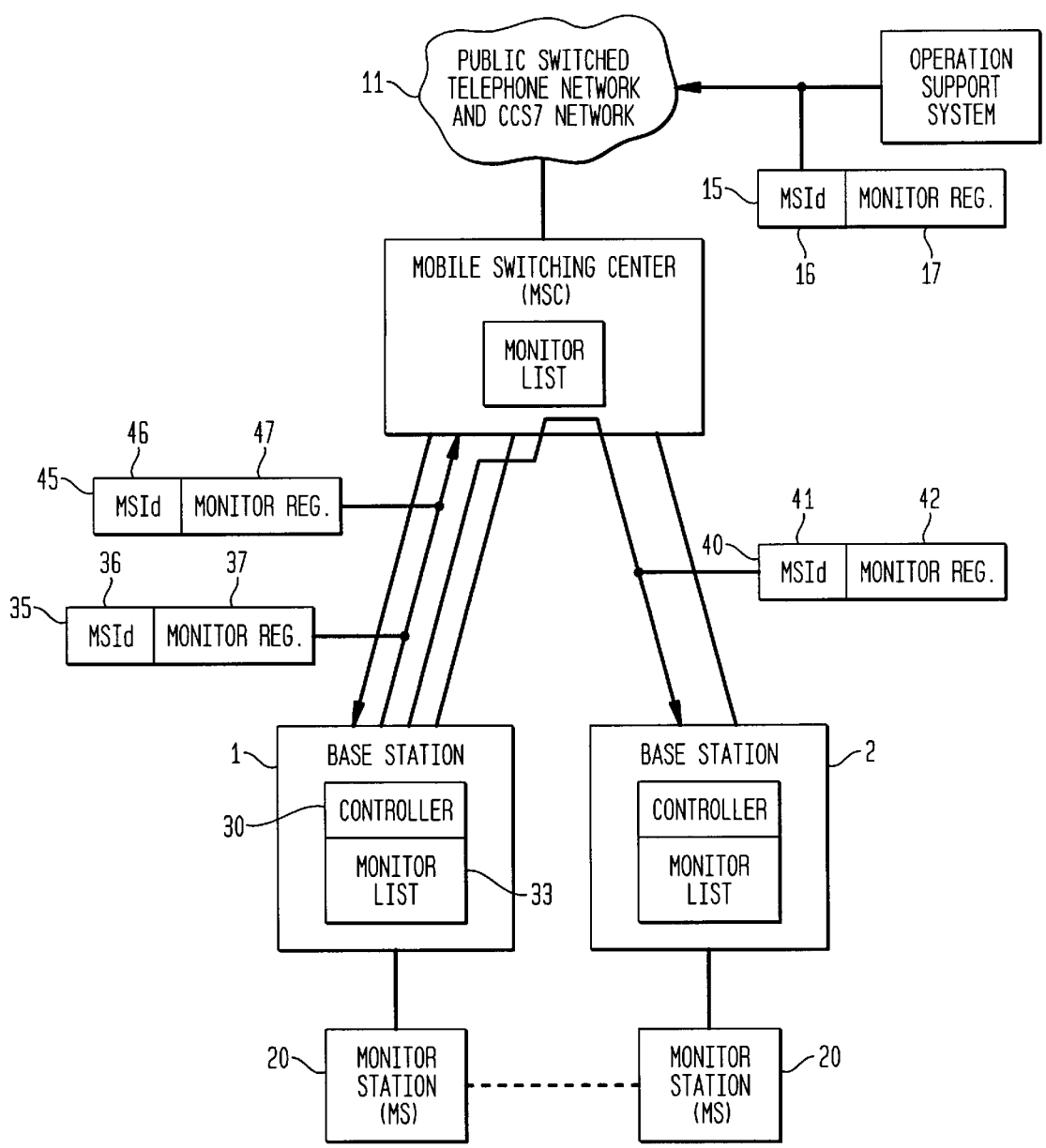
FIG. 1 illustrates a mobile switching system, and shows the key messages for implementing Applicant's invention.

FIG. 2 is a block diagram illustrating the operation of Applicant's invention. Mobile switching center 10 controls and switches for a plurality of base stations, two of which are BS1 and BS2, as shown in the diagram. MSC 10 maintains a monitor list 9, of mobile stations whose call processing actions are being recorded for analysis. Each base station has a controller, such as controller 30 of base station 1, and within that controller is maintained a monitor list 33, of the mobile stations being monitored. MSC 10 is connected to a data and switching network 11, comprising a CCS 7 data network for transmitting signaling information and data, and a public switched telephone network for transmitting communication signals to other switching systems, (not shown). Connected to the network 11, is an operation support system 12, for controlling operations, administration, and maintenance for MSC 10 and its' base stations. The operations support system 12, can be the source of a request to monitor a particular mobile station. Also shown, is a mobile station 20, which is initially in radio contact with base station 1, but which subsequently, moves to the area of base station 2, and is subsequently, in radio contact with base station 2. The radio contact between mobile station 20 and base station 1, is shown by the broken line, 21.

Also shown, on FIG. 1, are four types of messages. Message 15 is a message from operation support system 12 to MSC 10, requesting that a particular mobile station be monitored. The message includes the identification of the mobile station 16, and a request that this station be monitored, 17.

Message 40 is a similar type of message sent from base station 1 to base station 2, at the time mobile station 20 is handed off to base station 2. Message 40 includes the mobile station identifier 41, and the monitor request, 42. Message 45 is transmitted from a base station serving a monitored mobile station, to report the monitoring data. Message 45 comprises the mobile station identifier 46, and the call data being transmitted, 47. This call data can subsequently, be transmitted to the operation support system, 12.

FIG. 2 illustrates the operations performed in a mobile switching center. The MSC receives, or generates, a monitor request, (Action Block 201). The MSC can receive the monitor request from operation support system 12, or it may detect some condition under which the monitoring of the mobile station involved in the call is automatically initiated. The MSC places the mobile station of the request on its monitor request list, (Action Block 203). Subsequently, the MSC receives a mobile station origination request, or call termination request, (Action Block 205). Test 207 is used to determine whether the mobile station of Action Block 205 is on the monitor request list. If so, then the MSC transmits a monitor request message, such as message 35, to the base station serving the mobile station that originated. If the monitor station is not on the request list, or following the execution of Action Block 209, the call is processed as in the prior art, (Action Block 211).

If the MSC receives or generates an indication that monitoring of a mobile station is to be abandoned, (Action Block 221), then the mobile switching center removes the mobile station from the monitor request list, (Action Block 223). The request that monitoring is to be abandoned is likely to come from operation support system 12.

The MSC receives call data message for monitored mobile stations, (Action Block 230). This information is received in messages such as message 45. The MSC places the call data message in a record for the mobile station of the call data message, (Action Block 232). Subsequently, periodically, the MSC transmits call record data to the operation support system, (Action Block 234). Action Blocks 230, 232, and 234 are in the prior art.

FIG. 3 illustrates actions performed in the base station. The base station receives a monitor request message, (Action Block 301), such as message 35, or message 40, from the MSC or another base station, respectively. It will receive the monitor request message from the MSC upon origination of a call by the identified mobile station; it will receive the request from another base station as part of a hand-off procedure. The base station places the mobile station in its own monitor request list, (Action Block 303).

Subsequently, when the base station detects a reportable event for a mobile station, (Action Block 305), it will test whether that mobile station is on the monitor list, (Test 307). If the result of Test 307 is positive, then the message is sent to the MSC reporting the reportable event, (Action Block 309). Following the execution of Action Block 309, or if the mobile station is not on the monitor list, processing of the call proceeds as in the prior art, (Action Block 311), until the base station detects another reportable event, (Action Block 305). Action Blocks 305, 307, 309, and 311 are in the prior art.

When the base station hands off a call to another base station, (Action Block 321), it tests whether the mobile station of that call is on the monitor list, (Action Block 323). If so, then the base station sends a monitor request message to the handed off base station, (Action Block 325), and removes the mobile station from its monitor list, (Action Block 327). Following the execution of Action Block 327, or if the mobile station is not on the monitor list, then the call is processed as in the prior art, (Action Block 329). When the mobile call is terminated, (Action Block 341), a test is made whether the mobile station is on the monitor list of this base station, (Test 343). If so, the mobile station is removed from the monitor list for that base station, (Action Block 345). Following the execution of Action Block 345, or if the mobile station is not on the monitor list, the call is processed as in the prior art.

In this particular embodiment, separate messages are used to request that a mobile station be monitored by a base station. In alternative embodiments, this information can be transmitted as part of an originating request message from the MSC, or as part of a hand-off message from another base station through the use of a dedicated single bit indicator, to indicate whether or not monitoring is requested. The single bit indicator would, of course, be sent along with a message, which either directly or indirectly specified the identity of the mobile station.

In another alternative embodiment of Applicant's invention, an indication of whether a call is being monitored is maintained in the call record for that call. Advantageously, such an arrangement means that no supplementary list need be checked in order to determine whether a reportable event is to be reported to the MSC.

The above is a description of one preferred embodiment of Applicant's invention. Many other arrangement will be apparent to those of ordinary skill in the art, without departing from the scope of Applicant's invention. Applicant's invention is, therefore, only limited by the attached Claims.

What is claimed is:

1. In a wireless telecommunication system comprising a MSC, (Mobile Switching Center), and a plurality of base stations, a method for obtaining call processing data for reportable events for selected mobile stations, comprising the steps of:
    selecting mobile stations to be monitored for said reportable events;
    maintaining in the MSC, indications for all the selected mobile stations served by said MSC;
    maintaining in a base station, an indication only for the selected mobile stations currently served by that base station; and
    whenever a reportable event for a selected mobile station occurs, reporting pertinent data for said reportable event to said mobile switching center;
    wherein said pertinent data for said reportable events comprise data not reported to said MSC by mobile stations, served by said MSC, other than said selected mobile stations.

2. The method of claim 1, further comprising the step of:
    when a first base station hands off a call to a second base station, transmitting as part of a series of handoff messages an indication of whether a mobile station of the call being handed off is a selected mobile station.

3. The method of claim 1, wherein said indication is stored in a base station by storing in a base station, a list of selected mobile stations served by that base station.

4. The method of claim 1, wherein said indication is stored in a base station within a call record for said any selected mobile station selected served by that base station.

5. The method of claim 1, wherein the step of maintaining an indication comprises the step of receiving a message set for a mobile origination from said MSC, said message set comprising an indication that said selected mobile station is to be monitored.

6. The method of claim 5, wherein said indication comprises a message for requesting monitoring said selected station.

7. The method of claim 5, wherein said indication comprises an indicator for requesting monitoring of said selected mobile station, that is transmitted as part of an existing one of a set of messages for requesting an origination.

8. In the wireless telecommunication system of claim 5, further comprising an operation support system, the method of claim 5, further comprising the steps of generating a request to monitor a particular mobile station in said operation support system, and transmitting said request to said MSC.

9. The method of claim 1, further comprising the step of:
    responsive to receipt of a request for originating a call from, or terminating a call to, a mobile station on said list, transmitting a request to a base station serving said origination or termination, to monitor said call.

10. The method of claim 1, further comprising the steps of:
    when said second base station hands off a call to another base station, transmitting as part of a series of hand-off messages an indication of whether a mobile station of the call being handed-off is a selected mobile station; and
    if the mobile station of said call being handed off is a selected mobile station, reporting pertinent data for reportable events from said third base station;

wherein said third base station may be, but need not be, said first base station.

11. In a wireless telecommunication system comprising a MSC, (Mobile Switching Center), and a plurality of base stations, apparatus for obtaining call processing data for reportable events for selected mobile stations, comprising:

in base stations of said system, processor means for performing the following operations:

maintaining in a base station, an indication only for selected mobile stations served by that base station; and whenever a reportable event for a selected mobile station occurs, reporting pertinent data for said reportable event to said mobile switching center;

in said MSC, processor means for performing the following operations:

selecting mobile stations to be monitored for said reportable events; and maintaining in said MSC, indications for all selected stations served by said MSC;

wherein said pertinent data for said reportable events comprise data not reported to said MSC by mobile stations, served by said MSC, other than said selected mobile stations.

12. The apparatus of claim 11, wherein said processor means further performs the following operation:

when said base station hands off a call to another base station, transmitting as part of a series of hand-off messages an indication of whether a mobile station of the call being handed off is a selected mobile station.

13. The apparatus of claim 11, wherein said indication is stored in a base station by storing in a base station, a list of selected mobile stations served by that base station.

14. The apparatus of claim 11, wherein said indication is stored in a base station within a call record for said any selected mobile station selected served by that base station.

15. The apparatus of claim 11, wherein the operation of maintaining an indication comprises the operation of receiving a message set for a mobile origination from said MSC, said message set comprising an indication that said selected mobile station is to be monitored.

16. The operation of claim 15, wherein said indication comprises a message for requesting monitoring said selected station.

17. The operation of claim 15, wherein said indication comprises an indicator for requesting monitoring of said selected mobile station, that is transmitted as part of an existing one of a set of messages for requesting an origination.

18. In the wireless telecommunication system of claim 15, further comprising an operation support system, wherein said operation support system generates a request to monitor a particular mobile station in said operation support system, and transmits said request to said MSC.

19. The apparatus of claim 11, wherein said processor means further performs the following operation:

responsive to receipt of a request for originating a call from, or terminating a call to, a mobile station on said list, transmitting a request to a base station serving said origination or termination, to monitor said call.

20. The apparatus of claim 11, wherein said processor means further performs the following operations:

when said base station hands off a call to another base station, transmitting as part of a series of hand-off messages an indication of whether a mobile station of the call being handed off is a selected mobile station;

wherein if the mobile station of said call being handed off is a selected mobile station, reporting pertinent data for reportable events from said another base station.

* * * * *